United States Patent [19]
Eichhorn et al.

[11] Patent Number: 5,141,025
[45] Date of Patent: Aug. 25, 1992

[54] CHECK VALVE

[75] Inventors: Alexander Eichhorn, Ilsfeld; Hans-Joerg Fees, Bietigheim-Bissingen; Guenther Hohl, Stuttgart; Friedrich Megerle, Asperg; Guenter Kaes, Stuttgart, all of Fed. Rep. of Germany

[73] Assignee: Robert Bosch GmbH, Stuttgart, Fed. Rep. of Germany

[21] Appl. No.: 722,818

[22] Filed: Jun. 28, 1991

[30] Foreign Application Priority Data

Jul. 5, 1990 [DE] Fed. Rep. of Germany ....... 4021469

[51] Int. Cl.⁵ ............................................. F16K 15/04
[52] U.S. Cl. ................................ 137/539.5; 137/512.3
[58] Field of Search ..................... 137/539.5, 512.3

[56] References Cited

U.S. PATENT DOCUMENTS 4,393,895 7/1983 Rubey ..................... 137/539.5
4,877,052 10/1989 Toshio ..................... 137/512.3

FOREIGN PATENT DOCUMENTS 2213104 10/1972 Fed. Rep. of Germany ... 137/539.5
3926915 2/1991 Fed. Rep. of Germany .

Primary Examiner—Robert G. Nilson
Attorney, Agent, or Firm—Edwin E. Greigg; Ronald E. Greigg

[57] ABSTRACT

A quiet closure check valve, including a housing having a valve seat toward the housing, a ball is associated with the valve seat to close the valve. The ball is received longitudinally displaceably in a recess of a spring-loaded support element that is defined by a bottom and a collar-like portion. Upon closure of the check valve, the support element rests on the housing, by spring action. The ball is lifted from the bottom of the support element and applied to the valve seat by the pressure of the fluid, in a manner free of spring forces. In this way, bothersome vibration of the ball is avoided.

12 Claims, 1 Drawing Sheet

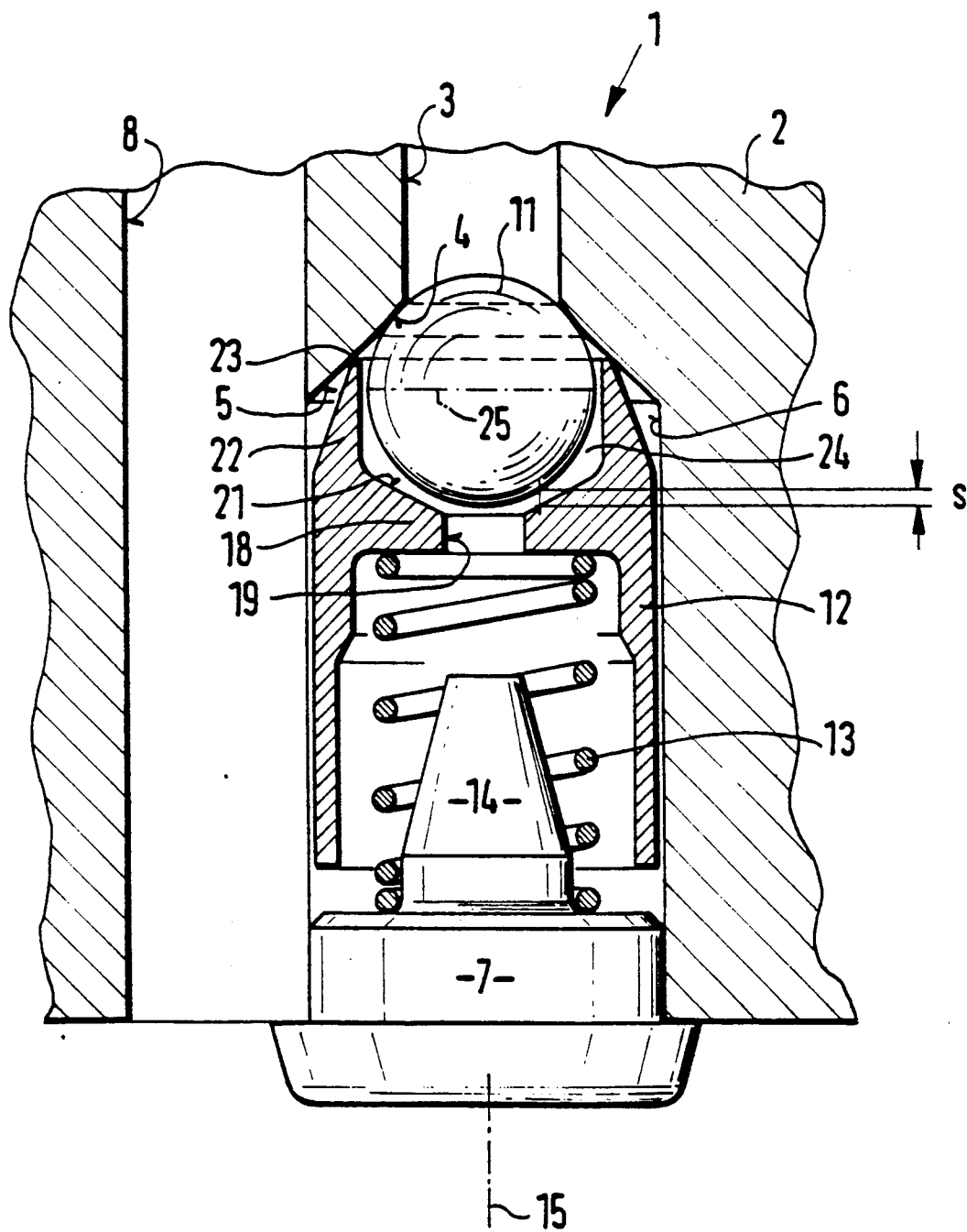

CHECK VALVE

BACKGROUND OF THE INVENTION

The invention is based on a check valve as defined hereinafter. A check valve of this kind has already been proposed (German Patent Application P 69 26 915.9), in which to reduce noise, a ball serving as a closing element is embraced up to its great circle, by a collar-like portion of a spring-loaded support element. When the valve is opened, the pressure medium is therefore diverted in a hydraulically favorable manner from the free surface of the ball toward the valve seat via the collar-like portion of the support element, and vibration of the moving valve parts is avoided. However, it has been found that vibration can occur when the check valve closes under unfavorable conditions, causing bothersome noise.

OBJECT AND SUMMARY OF THE INVENTION

The check valve according to the invention has an advantage over the prior art that the ball, at the ends of the check valve closing stroke, is free of spring force, and is moved into its closing position solely by forces resulting from pressure differences, without being exposed to intensive vibration that could cause bothersome noises. The check valve is therefore advantageously usable in hydraulic, vehicle brake systems with anti-skid control systems and/or spin limiting systems, i.e. traction control systems, that are not supposed to cause any vibration of the passenger compartment when they are activated.

It has been found that the low-vibration behavior of the ball is attained even with the dimensions disclosed herein, which are simple to attain from a manufacturing standpoint.

The provisions defined herein are advantageous in the sense that they produce centering and longitudinal guidance of the ball in the support element, which promotes a central contact of the ball with the valve seat. This provision therefore contributes to increasing the functional life of the check valve.

A further feature of the check valve defined herein has an advantage that on the one hand a hydraulically favorable deviation of the pressure fluid across the free surface of the ball and the collar-like, support sleeve portion along with the valve seat and housing bore portion, and on the other hand an axial limitation of the support element stroke upon closure of the check valve are attained. The incomplete sealing prevents inducement of vibration on the part of the sleeve.

Finally, still another provision disclosed herein has an advantage that the noise-damping property of the plastic is utilized in the cooperation of the support element with the ball and the housing of the check valve.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an exemplary embodiment of the invention in simplified form in a longitudinal section through a check valve.

DESCRIPTION OF THE PREFERRED EMBODIMENT

A check valve 1 is disposed in a steel housing 2, which has an inflow opening 3 for a gaseous or liquid pressure fluid. The inflow bore 3 discharges into a hollow-conical valve seat 4. It is adjoined by a likewise hollow-conically defined portion 5 of a housing bore 6 that extends coaxially with the inflow bore 3 and is of larger diameter compared with it. The cone angle of the portion 5 is somewhat larger than that of the valve seat 4. The bore 6 is closed off, at its end remote from the valve seat 4, by a closure element 7. The housing 2 also has an outflow bore 8 extending parallel to the bore 6 and intersecting it on its circumference, so that pressure fluid located in the bore 6 can cross over to the outflow bore 8, and vice versa.

The check valve 1 has a closing element, associated with the valve seat 4, in the form of a hardened steel ball 11 disposed in the bore 6. Also located in the bore 6 are a sleeve-like support element 12 for holding the ball 11 and a spring 13. The spring 13, embodied as a helical compression spring, is guided on a tang 14 of the closure element 7, against which it is supported by one end, while by its other end it engages the support element 12. The inflow bore 3, valve seat 4, bore portion 5, bore 6, closure element 7, ball 11, support element 12 and spring 13 are disposed coaxially with the longitudinal axis 15 of the check valve 1.

The rotationally symmetrical support element 12, made of glass fiber reinforced polyamide, is guided with little lateral play in the bore 6 of the housing 2 containing pressure fluid. The support element 12 is longitudinally movable in the bore 6, counter to the force of the spring 13. The sleeve-like support element 12 has a bottom 18 toward the valve seat, with a centrally disposed opening 19 of small diameter. The spring 13 engages the side of the bottom 18 remote from the valve seat 4. Toward the valve seat 4, the bottom 18 is embodied as a hollow conical seat 21 extending coaxially with the opening 19. The support element 12 is also provided with a collar-like portion 22 beginning at the bottom 18. On its outside, the collar-like portion 22 tapers conically at an acute angle and ends in an approximately knife-shaped encompassing edge 23. Beginning at this edge, the collar-like portion 22, which is defined circular-cylindrically on the inside, forms a recess 24 for the ball 11 of the check valve 1.

As can be clearly seen from the drawing, the support element 12 embraces the ball toward the valve seat with its collar-like portion 22 to beyond the great circle 25 of the ball, once the check valve 1 assumes its closing position, shown. In this closing position, the support element 12 is moved toward the valve seat 4 by the action of the spring 13, so that the encompassing edge 23 of the collar-like portion 22 is supported on the hollow-conical portion 5 of the housing bore 6. Since in the closing position of the check valve 1, the pressure of the fluid in the bore 6 exceeds the pressure in the inflow bore 3, the ball 11 is moved from the bottom of the support element 12 by the forces resulting from this pressure difference and is supported on the hollow-conical valve seat 4. An axial play s occurs between the ball 11 and the region of the hollow conical seat 21 on the bottom 18 of the support element 12 that the ball is capable of engaging when the check valve 1 is opened; for a ball diameter of 2.5 mm, for example, this play is preferably 0.1 mm. It can also be seen that the ball 11 has a slight radial play with respect to the inside circumference of the collar-like portion 22 of the support element 12. As a result, easy longitudinal mobility of the ball 11 in the recess 24 of the support element 12, on the one hand, and resistance-free centering of the ball 11 on the valve seat 4, on the other, are attained.

If the pressure of the fluid in the inflow bore 3 is higher that the pressure in the housing bore 6, then the ball 11 is lifted from the valve seat 4 and moved toward the hollow conical seat 21 on the bottom 18 of the support element 12. The support element 12 and the ball 11 are moved into the open position of the check valve 1 by the pressure of the fluid, counter to the force of the spring 13, until striking the closure element 7, so that the pressure fluid can flow from the inflow bore 3 across the free surface of the ball and the collar-like portion 22 of the support element 12 through the bore 6 of the housing 2 into the outflow bore 8.

If the pressure in the inflow bore 3 decreases, then the support element 12 and the ball 11 are moved by the spring 13 toward the valve seat 4. In this process the support element 12, with the encompassing edge 23 of its collar-like portion 22, meets the hollow-conical portion 5 of the housing bore 6 without sealing it off completely. By the pressure of the fluid acting on its surface remote from the valve seat 4, the ball 11 is now lifted from the hollow-conical seat 21 of the support element bottom 18 and moved until it contacts the valve seat 4, so that the check valve 1 closes. It has now been found that this hydraulically effective closing movement of the ball 1 proceeds with low vibration.

The check valve according to the invention can be preferentially used in hydraulic systems, that is, systems in which low noise, fast valve opening and low valve wear are important. A preferred field of application for the check valve of the invention is pressure control valves in hydraulic brake systems having anti-skid control systems and/or spin limiting systems The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A check valve (1) including a housing (2), a flow passage (3) in said housing, a hollow-conical valve seat (4) on said housing (2) between said flow passage (3) and a housing bore extending coaxially with the valve seat, a ball (11) associated with the valve seat as a closing element, a sleeve-like support element (12) that is longitudinally guided counter to a force of a spring (13) in the housing bore (6), said sleeve-like support element includes a bottom (18) with a central opening (19) and a collar-like portion (22) beginning at the bottom, said collar-like portion embraces the ball and is tapered conically on one end toward the valve seat, and said ball (11) is partially encompassed by the support element and longitudinally movable with an axial play in the support element for seating on said valve seat (4).

2. A check valve as defined by claim 1, in which the axial play(s) between the ball (11) contacting the valve seat (4) in the closing position and the bottom (18) of the support element (12) engaging the housing (2) is preferably 0.1 mm.

3. A check valve as defined by claim 2, in which the bottom (18) of the support element (12) forms a hollow-conical seat (21) for the ball (11) that extend between the collar-like portion (22), which is circular-cylindrically defined on the inside, and the opening (19) in the middle of the bottom.

4. A check valve as defined by claim 1, in which the support element (12), with its collar portion (22), embraces the ball (11) toward the valve seat to beyond a great circle (25), and by the force of the spring (13), one end of said support element is capable of engaging a hollow-conically defined portion (5) of the housing bore (6) extending coaxially with the valve seat (4), without sealing it off completely from the housing.

5. A check valve as defined by claim 3, in which the support element (12), with its collar portion (22), embraces the ball (11) toward the valve seat to beyond a great circle (25), and by the force of the spring (13), one end of said support element is capable of engaging a hollow-conically defined portion (5) of the housing bore (6) extending coaxially with the valve seat (4), without sealing it off completely from the housing.

6. A check valve as defined by claim 1, in which the ball (11) and the valve seat (4) comprise steel, and the support element (12) comprises plastic.

7. A check valve as defined by claim 2, in which the ball (11) and the valve seat (4) comprise steel, and the support element (12) comprises plastic.

8. A check valve as defined by claim 3, in which the ball (11) and the valve seat (4) comprise steel, and the support element (12) comprises plastic.

9. A check valve as defined by claim 4, in which the ball (11) and the valve seat (4) comprise steel, and the support element (12) comprises plastic.

10. A check valve as defined by claim 5, in which the ball (11) and the valve seat (4) comprise steel, and the support element (12) comprises plastic.

11. A check valve as set forth in claim 1 in which the collar-like portion (22) is tapered along an outer surface on said one end toward the valve seat.

12. A check valve as set forth in claim 11 in which said collar-like portion has an inner diameter which is greater than a great circle of the ball (11) to provide a spacing between the inner diameter of said collar-like portion and the ball.

* * * * *